United States Patent [19]

Mueller

[11] 4,054,212
[45] Oct. 18, 1977

[54] CUP DISPENSING APPARATUS AND METHOD

[75] Inventor: Martin Mueller, Wonder Lake, Ill.

[73] Assignee: Owens-Illinois, Inc., Toledo, Ohio

[21] Appl. No.: 653,222

[22] Filed: Jan. 28, 1976

[51] Int. Cl.[2] .............................................. B65G 59/10
[52] U.S. Cl. ............................ 214/8.5 A; 214/8.5 C; 214/8.5 K; 214/152; 221/11; 221/119; 221/221; 141/174; 198/803
[58] Field of Search ............... 221/190, 175, 187, 176, 221/221, 178, 182, 183, 184, 11, 14, 223, 297, 22, 251, 119, 232, 266, 174; 141/174, 173; 214/8.5 R, 7, 8.5 A, 8.5 C, 8.5 D, 8.5 K, 152; 198/803

[56] References Cited

U.S. PATENT DOCUMENTS

| | | | |
|---|---|---|---|
| 1,160,487 | 11/1915 | Barker | 221/182 |
| 1,539,161 | 5/1925 | Columbro | 141/174 X |
| 1,683,950 | 9/1928 | Borchert | 214/8.5 K X |
| 1,963,621 | 6/1934 | Geyer | 214/8.5 D X |
| 2,385,267 | 9/1945 | Franz | 221/11 |
| 2,624,647 | 1/1953 | Lawson | 14/8.5 C X |
| 3,161,321 | 12/1964 | Mellion et al. | 221/266 |
| 3,497,086 | 2/1970 | Adams et al. | 214/8.5 A X |
| 3,640,408 | 2/1972 | Adams | 214/8.5 D X |
| 3,795,346 | 3/1974 | Roberts | 221/223 |

*Primary Examiner*—Frank E. Werner
*Attorney, Agent, or Firm*—D. R. Birchall

[57] ABSTRACT

An apparatus and method for automatically supplying cups to a filling station is disclosed herein. The apparatus consists of means for moving nested cups along a generally horizontal path that has guide means at the end thereof with pusher means engageable with the rim of a leading cup which drives the leading cup from the nested group to the filling station. Gripper means engage the rim of the next succeeding cup for holding the remaining cups while the leading cup is moved from the group of nested cups. The apparatus also incorporates mechanism for automatically releasing the leading cups at a specific location with respect to the filling station so that they drop by gravity to the filling station and also mechanism that automatically moves the gripper means to grip the next succeeding cup for holding the group while another cup is moved from the group path. The apparatus also includes mechanism for automatically feeding additional groups of nested cups to the path when there are a predetermined minimum number of cups in the path.

31 Claims, 11 Drawing Figures

CUP DISPENSING APPARATUS AND METHOD

BACKGROUND OF THE INVENTION

The present invention relates generally to the field of dispensing apparatus and more particularly to the dispensing of cups or containers to a filling machine. While not limited to any particular field of use, the present invention is particularly adapted for continuously supplying cups to a filling machine of the type disclosed in U.S. Pat. No. 3,838,550.

In recent years, considerable attention has been devoted to developing high speed filling machines for filling small containers with various types of products. The automatic dispensing machine disclosed in the above-mentioned patent is capable of automatically filling and supplying closures to small containers at a rate of more than 150 containers per minute.

In utilizing high speed filling apparatus of the type disclosed in the above-mentioned patent, the time and labor required for positioning the cups on the conveyor that carries them through the filling machine has always been a considerable cost item. Most of the automatic filling machines incorporate a cup feeding mechanism of the type disclosed in the above-mentioned patent which includes a vertically extending magazine which receives the nested cups or containers and the containers are removed individually at the lower end by either vacuum drawing or some type of gripping mechanism. One of the major problems encountered in utilizing this type of feed mechanism in a high speed automatic filling machine is that the operator must continuously be supplying containers to the magazine. Since the magazines extend vertically, the number of containers that can be inserted at any given time is severly restricted because it requires the operator to reach to the top of the magazine to insert the group of nested containers.

Another problem encountered with feeding mechanisms heretofore known is that if the containers are deformed or are wedged to each other, the feeding mechanism has a tendency to jam.

Various types of automatic feeding mechanisms have been developed. For example, Mueller U.S. Pat. No. 3,472,403 and St. Clair et al. U.S. Pat. No. 3,616,951 disclose apparatus which automatically replenishes stacks of cups at a cup feeding station. While the apparatus disclosed in these patents has found a substantial degree of commercial success, each apparatus requires a specific arrangement of the groups of cups within a carton.

SUMMARY OF THE INVENTION

According to the present invention, there is provided an automatic feeding mechanism for feeding individual rimmed cups or containers from a continuous nested supply with a positive mechanical action which eliminates uncontrolled movement of the containers that may result in misalignment or mispositioning during subsequent operations. The positive mechanical action for moving individual containers also facilitates feeding containers with malfunctioned rims or ridges and insures that wedged containers are positively separated.

The apparatus is designed so that the containers are fed along a horizontal path which permits situating the unit at a lower elevation thereby eliminating the need for the operator to stretch upward to load the magazines. The apparatus also includes a large storage hopper wherein a large number of containers may be stored and automatically fed to the path where the containers are separated which substantially reduces the amount of operator attention required for the apparatus.

More specifically, according to the method aspect of the present invention, a supply of nested, rimmed containers is continuously urged along a generally horizontal path and the leading container is gripped adjacent the rim while the movement of the remaining containers is interrupted by holding fingers. The gripped leading container is moved along a generally arcuate path towards a filling station and is released at a specific location so that the container falls by gravity to the filling station. Additional groups of nested containers are automatically fed to the horizontal path and are automatically nested with the remaining containers already in the path.

The apparatus for continuously feeding individual cups to a conveyor that forms part of a filling station includes an endless conveyor for moving a plurality of nested rimmed cups along a generally horizontal path which has guide means at the end thereof for guiding the cups from the supply means to the filler conveyor. The apparatus also includes pusher means for positively gripping the rim of the leading cup and driving the leading cup generally along the guide means while holding means engage the rim of the next cup for holding the remaining cups while the leading cup is removed. The leading cup is automatically released at a selected location and the pusher means is returned to the group of nested cups while the holding or gripper means grips the next succeeding cup to repeat the operation.

The apparatus also includes feeding means for feeding a plurality of groups of cups automatically to the path. The feeding means includes a hopper that has a lower open end above and aligned with the path with a cup receiving member rotated about a fixed axis in the open end. The cup receiving member receives a group of cups from the hopper and is automatically rotated by motor means actuated by a sensing means that senses the presence of a minimum number of cups in the path. Rotation of the cup receiving member deposits another group of cups along the path which are automatically then nested with the remaining cups in the path.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

Figure 1:
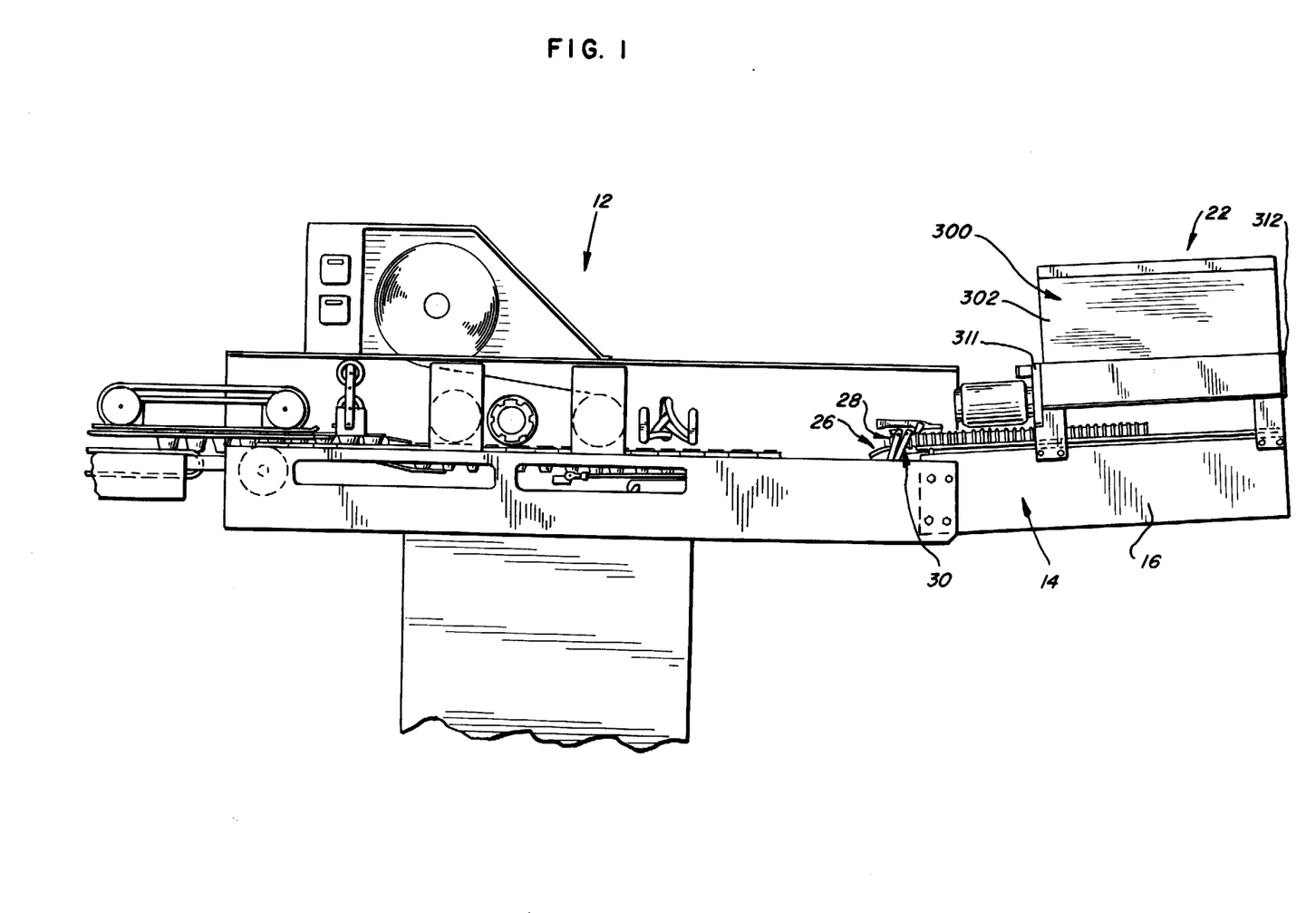
FIG. 1 of the drawings discloses a cup filling apparatus having the cup dispensing apparatus of the present invention associated therewith.

FIG. 1 of the drawings discloses a side elevation view of a cup filling and closure applying apparatus 12 of the type disclosed in U.S. Pat. No. 3,838,550 with the cup feeding mechanism 14 of the present invention attached thereto. Since the filling apparatus forms no part of the invention, a detailed description thereof does not appear to be necessary. However, for purposes of completeness, the disclosure of the above-mentioned patent is incorporated herein by reference.

General Description

Apparatus 14 for automatically feeding individual cups to a filler or filling station consists of a frame 16 supporting feed means 22 (FIG. 1) for continuously feeding groups of nested rimmed cups to a generally horizontal path. The groups of nested cups are moved along the generally horizontal path by conveyor means 24 (FIG. 2), supported on frame 16, which continuously urge the nested cups towards a holding and separating station. The holding and separating station consists of guide means 26 at the end of the path above the filler station, pusher means 28 engageable with the rim of the leading cup in the path, and gripper means 30 for holding the remaining cups in the path while the leading cup is being moved along the guide means.

Figures 2, 10:
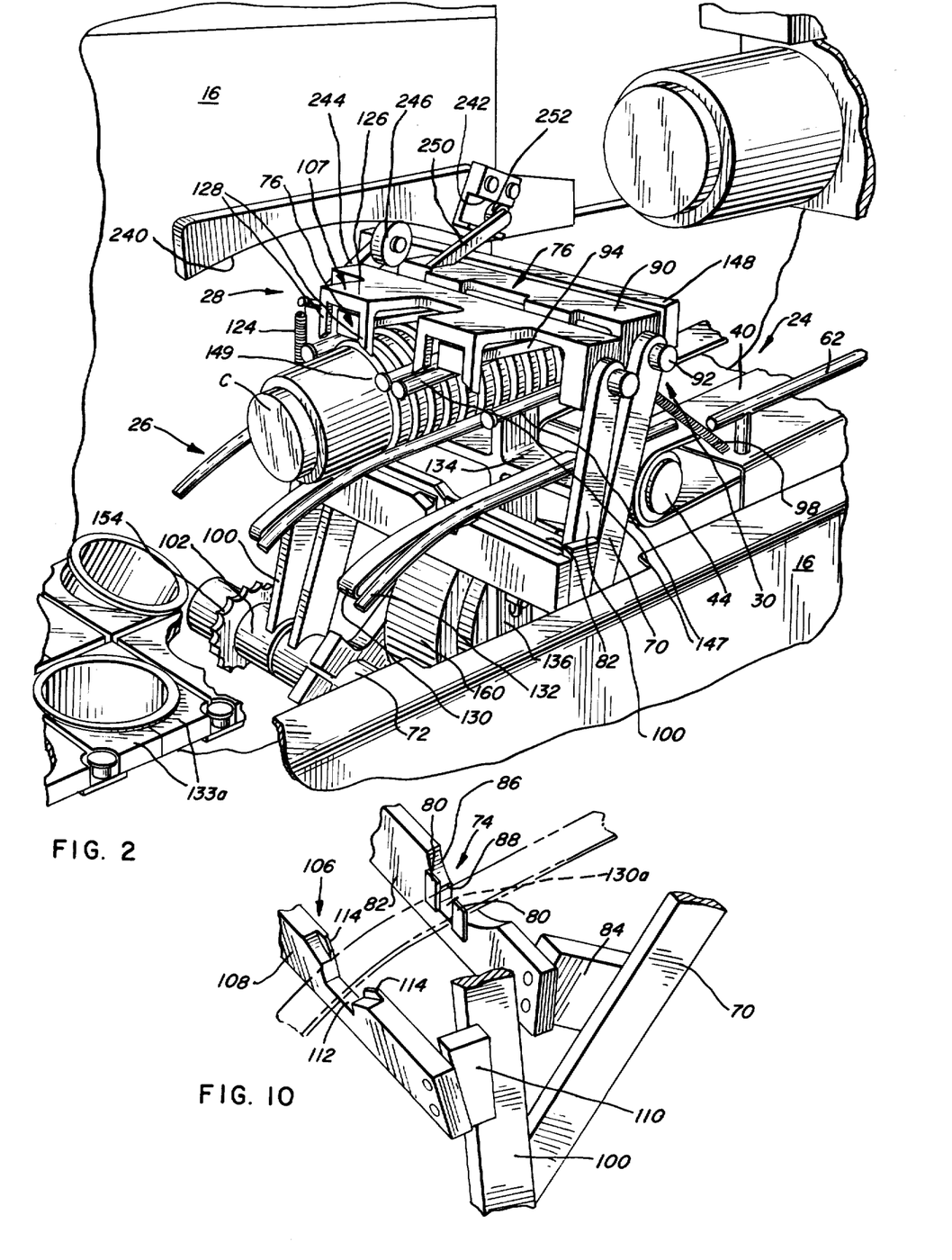
FIG. 2 is an enlarged fragmentary perspective view of the separating and holding mechanism that forms part of the overall cup feeding mechanism.
FIG. 10 (appearing with FIG. 2) is an enlarged fragmentary view of a portion of the pusher and gripper means.
Figure 6:
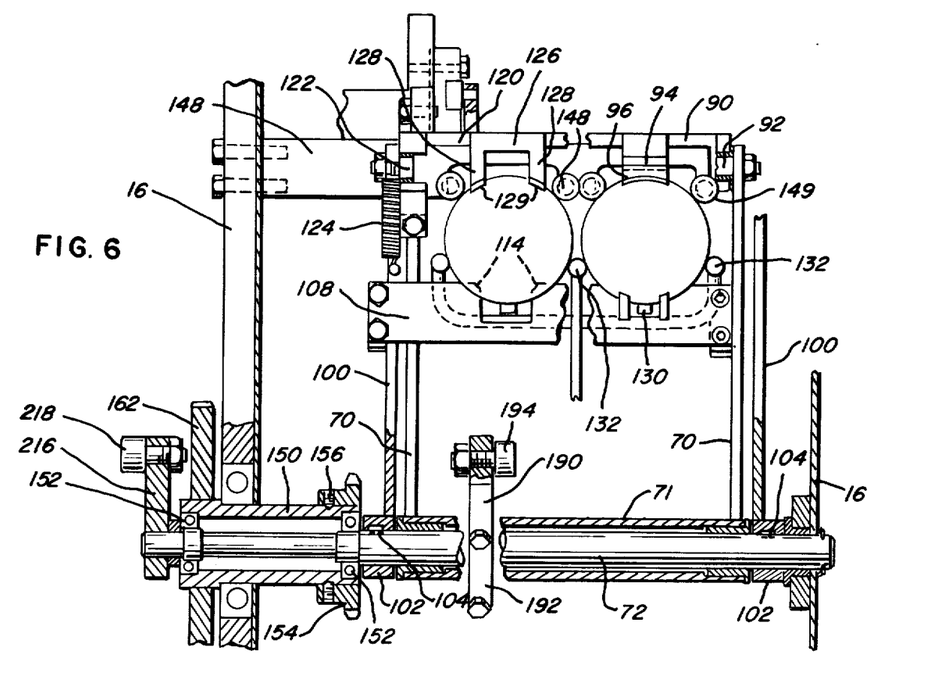
FIG. 6 is a vertical section as viewed along line 6—6 of FIG. 3.

An inspection of FIGS. 2 and 6 shows that the apparatus includes two transversely spaced parallel paths for two groups of nested containers so that two containers are simultaneously delivered to the filling station. However, since both paths and the various parts associated therewith are identical in construction and operation, only one path will be described in detail with an understanding that the second path has identical structural details.

Conveyor Means 24

Figure 3:
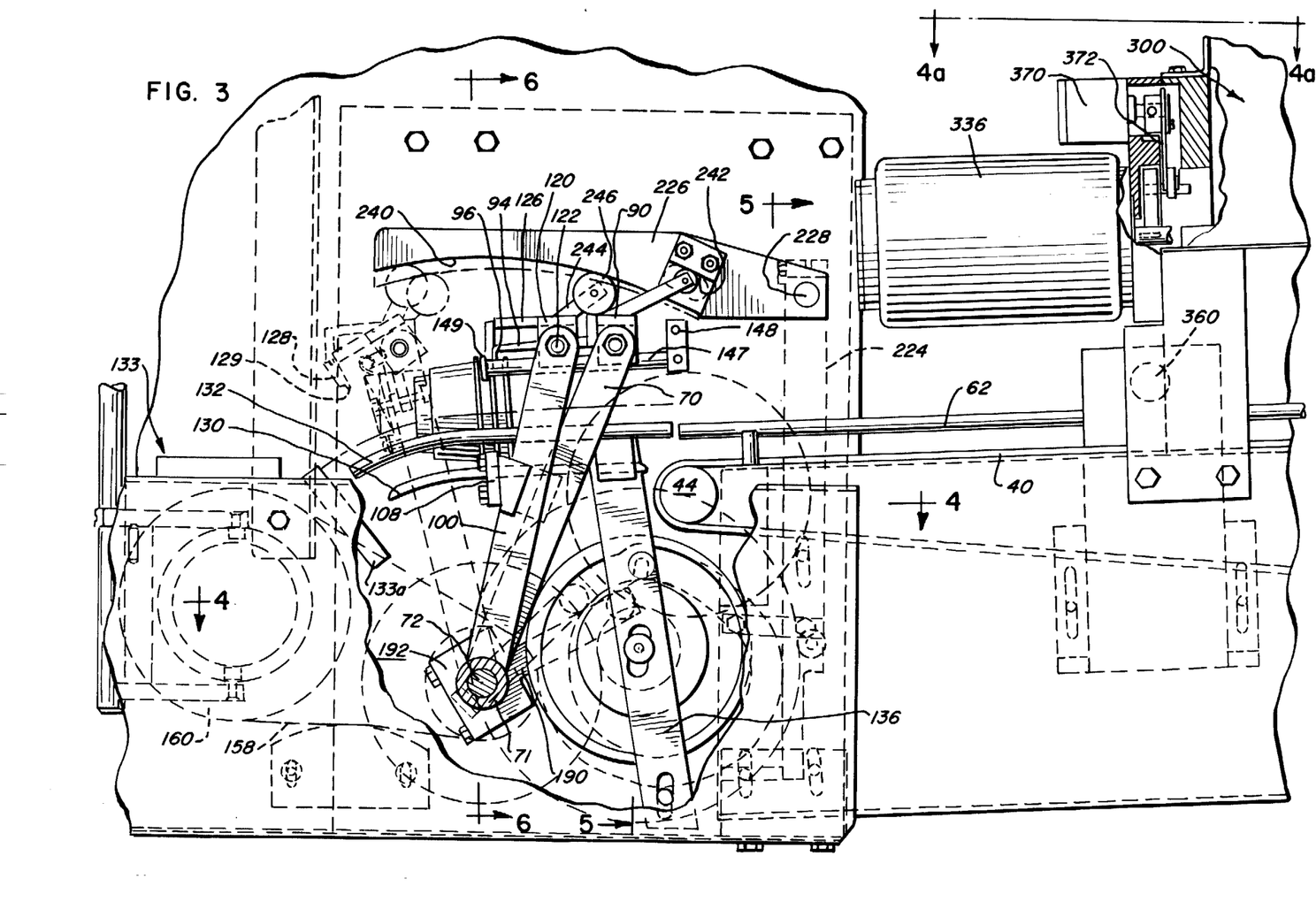
FIG. 3 is an enlarged fragmentary side elevation of the mechanism shown in FIG. 2 with parts thereof broken away for purposes of clarity.
Figure 4:
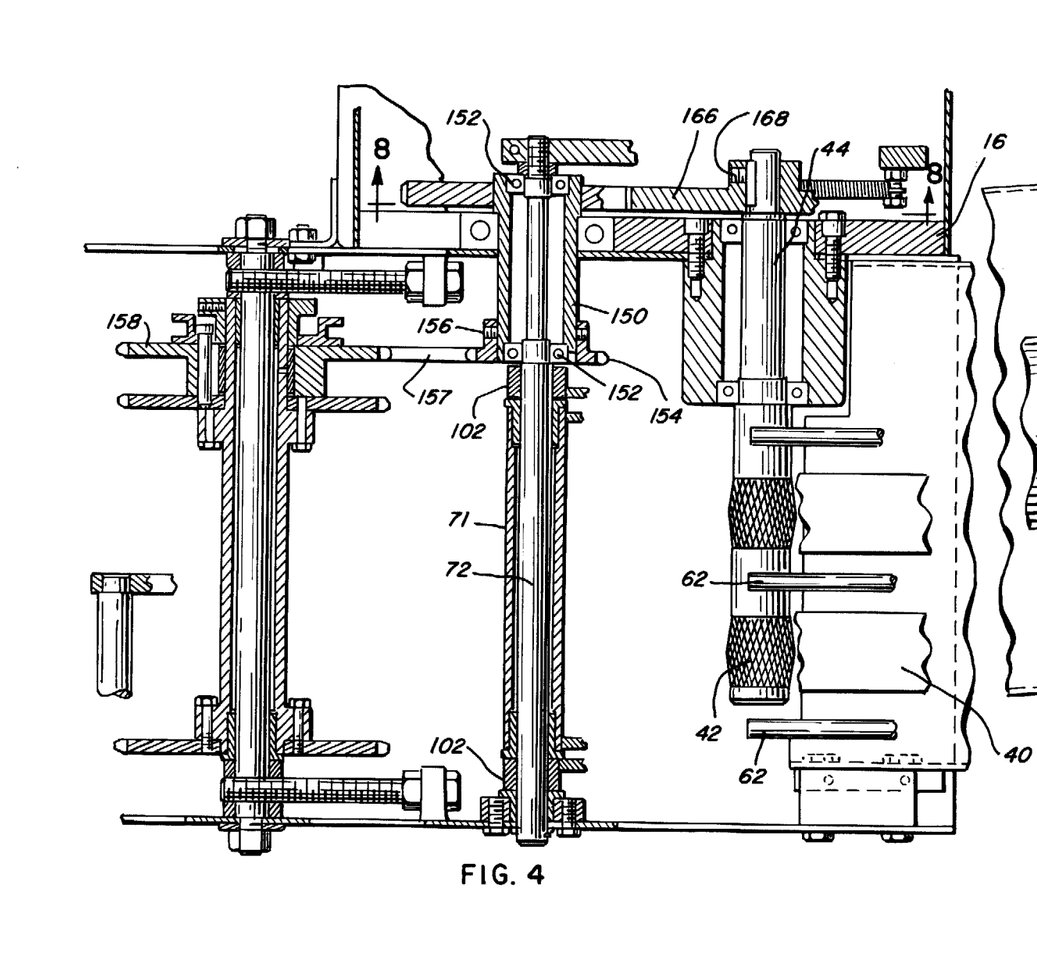
FIG. 4 is a horizontal section viewed generally along line 4—4 of FIG. 3.

Conveyor means 24 is shown in FIGS. 2, 3, 4 and 7. Conveyor means 24 includes an endless belt 40 entrained over a driven roller 42 (FIG. 4) fixed to a shaft 44 that is rotated about a fixed axis on frame 16. As illustrated in FIG. 4, drive roller 42 is formed by a knurled surface on shaft 44 for gripping endless belt 40. The opposite end of endless belt 40 is supported on an idler roller 46 (FIG. 7) that is rotatably supported on a fixed shaft 48 secured to frame 16. Idler roller 46 is maintained in a transversely spaced fixed position by enlarged hubs 50 that are secured to shaft 48.

Endless conveyor 24 also has a tension roller 52 (FIG. 7) located intermediate rollers 42 and 46 with tension roller 52 supported on a stub shaft 54 that is fixed to an arm 56 which is adjustably secured to a shaft 58 on frame 16 with arm 56 being held in position by a screw 60. Thus, tension of the belt may be varied by releasing screw 60 and moving arm 56 with respect to fixed shaft 58. A pair of fixed guide rails 62 are secured to frame 16 and extend above conveyor belt 40 on opposite sides thereof.

The details of the drive mechanism for drive rollers 42 will be described in more detail later.

Gripping Mechanism 30

The details of gripping or holding mechanism 30 will be described with reference to FIGS. 2, 3, and 6. The function of gripper means or holding means 30 is to hold all but the leading cups or containers in the path while the leading container is being moved to the filling station, as will be described later. Gripper means 30 consists of a pair of arms 70 that have a sleeve 71 (FIG. 6) secured thereto at one end thereof with sleeve 71 being supported on a shaft 72 that is carried by frame 16 as will be described in more detail later.

Gripper means 30 also includes an opposed pair of finger means 74 (FIG. 10) and 76 (FIG. 2). Referring to FIG. 10 it will be noted that lower finger means 74 consists of two narrow plates 80 that are fixed to a crossbar 82 which is secured at opposite ends to arms 70 through brackets 84. Bar 82 is spaced from arms 70 by a predetermined dimension as will be explained later. Crossbar 82 also has an arcuate slot 86 extending from the upper surface thereof and this arcuate slot has a configuration that corresponds generally to the configuration of the periphery of the container C adjacent the rim thereof. Arcuate recess 86 also has a slot 88 in the base thereof which receives a portion of the guide means 26, as will be described later.

Upper finger means 76 consists of a crossbar 90 that extends between and is pivotally supported on arms 70. As more clearly shown in FIG. 6, crossbar 90 is rotatably supported on studs 92 (only one being shown) secured to the upper free ends of arms 70. Crossbar 90 has a finger 94 (FIG. 3) extending therefrom and the outer end of finger 94 has a perpendicular flange portion 96 extending towards fingers 80 on fixed bar 82. Second or upper finger means 76 is normally biased to a first position, illustrated in FIG. 3, by a spring 98 interposed between frame 16 and crossbar 90. Again, the mechanism for pivoting upper finger means 76 towards and away from lower finger means 74, between first and second positions, will be described in more detail hereafter.

Pusher Means 28

The details of pusher means 28 are again most clearly illustrated in FIGS. 2, 3 and 6. As shown therein, pusher means consists of a pair of pusher arms 100 which have their lower ends secured to hubs 102 (FIG. 6) and hubs 102 are keyed to shaft 72 by keys 104. Pusher means 28 has first and second opposed finger means 106 and 107.

Finger means 106 is defined on a rigid cross brace 108 (FIG. 10) that extends between arms 100 with cross brace 108 being offset from arms 100 and secured thereto by brackets 110. Cross brace 108 has a recess 112 extending from an upper edge thereof with a pair of fingers 114 extending above recess 112 adjacent one edge thereof. As most clearly shown in FIG. 10, fingers 114 may be integral with cross brace 108. Recess 112 has a central lower flat portion for receiving portions of guide means 26, as will be described in more detail hereafter, and the upper portion of recess 112 is adapted to receive and support rims R of containers C.

Second or upper finger means 107 is rotatably supported on the outer free end of arms 100. Upper finger means 107 consists of a generally U-shaped member 120 that is supported at opposite ends on arms 100 through studs 122 (FIG. 6), only one being shown, and is normally biased to a first position by a spring 124 (FIG. 2) that is secured to one arm 100 and to U-shaped member 120. U-shaped member 120 has an integral extension or finger portion 126, the outer end of which has a pair of perpendicularly disposed transversely spaced fingers 128.

As most clearly shown in FIG. 2, the transversely spaced fingers are positioned so that portion 96 of gripper finger means 76 may be located between transversely spaced fingers 128. It should also be noted that the lower ends of fingers 128 have a small projection 129 extending from the rear edge thereof, for a purpose that will be described later.

The manner in which the opposed finger means 106 and 107 are moved towards and away from each other, more specifically upper finger means 107 is moved between first and second positions, as well as moving pusher arms 100 between first and second positions will be described in more detail with respect to the description of the drive means.

Guide Means 26

Guide means 26 is most clearly illustrated in FIGS. 2, 3, 5 and 6. Guide means 26 consists of a lower rail 130 and a pair of transversely spaced rails 132, all of which are fixed to a rail support 134 (FIG. 2) that has an arm 136 extending therefrom. Arm 136 is supported at its lower end on a pin 138 (FIG. 5) which is received into an elongated slot 140 on the lower end of arm 136. Pin 138 is supported on frame 16 and has a stop 142 secured to the outer end thereof so that arm 136 may be raised and lowered with respect to frame 16, as will be described later.

Arm 136 also has a further elongated slot 144 intermediate its ends which receives a pin 146 so that the arm and consequently guide support 134 and guide rails 130, 132 may be raised and lowered with respect to frame 16, for a purpose that will be described later. An inspection of FIG. 10 shows that lower rail 130 has a reduced portion 130a that is located between fingers 80 and also has a portion located in the base of recess 112 formed in cross brace 108.

As most clearly shown in FIGS. 2 and 3, guide rails 130, 132 define an arcuate extension for the path of the moving containers C defined by conveyor means 24 and guide rails 62. Also, the adjacent ends of guide rails 132 and guide rails 62 are in close proximity to each other as shown in FIG. 3. The outer ends of guide rails 130 and 132 terminate in close proximity to conveyor 133 that forms part of the filling apparatus 12, for a purpose that will be described later.

Guide means 26 also includes a pair of transversely spaced fixed rails 147 that are secured to a cantilevered arm 148 which is secured at one end to frame 16. These fixed rails 147 are located above the path for the nested containers C, for a purpose that will be described later. The outer ends of rails 147 have enlarged washers 149 secured thereto for a purpose that will be described later.

Drive Means

According to one aspect of the present invention, all of relatively movable elements of the cup feeding mechanism are driven from a common drive consisting of a single driven shaft so that the various functions can readily be synchronized.

Referring to FIGS. 1, 2, 4, 6 and 8, the drive means for the entire system consists of an input (FIG. 4) which includes a hollow sleeve 150 supported by bearings 152 on a reduced portion of shaft 72. An input sprocket 154 is secured by a set screw 156 to the inner end of sleeve 150. This sprocket 154 is preferably driven by a chain 157 which is entrained over a further sprocket 158 that forms part of one end of the support for conveyor 133. Thus, the input 150 to the feeding mechanism is synchronized with the movement of conveyor 133 that forms part of the filling machine 12.

A gear 162 (FIG. 8) is secured to the outer end of sleeve 150 and is in mesh with a further gear 164. Gear 164 is also in mesh with a further gear 166 which is secured to the outer end of shaft 44 through a set screw 168 (FIG. 4). Thus, endless conveyor 40 is driven by gear 166.

Figure 5:
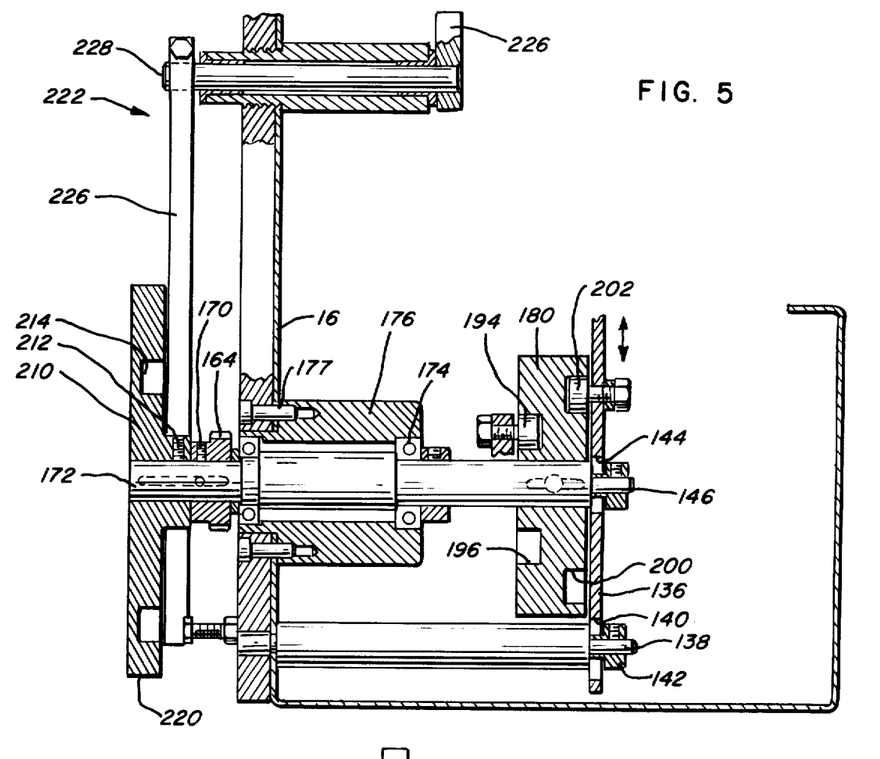
FIG. 5 is a vertical section as viewed along line 5—5 of FIG. 3.

As illustrated in FIG. 5, gear 164 is connected by a set screw 170 to a shaft 172 that is rotatably supported by bearings 174 in a hub 176 that is secured to frame 16 by screws 177. Shaft 172 has a first cam member 180 that has two camming surfaces defined thereon which respectively pivot gripper arms 70 between first and second position and also move guide means 26 between lowered and raised or first and second positions. Referring to FIGS. 3, 5 and 6, it will be noted that sleeve 71 has a cam arm 190 secured thereto by a block 192 and the outer end of cam arm 190 has a cam roller or cam follower 194 rotatably supported thereon. Cam follower 194 rides on a camming surface defined by a recess 196 extending from one surface of cam member 180. The development of cam surface and the amount of movement of gripper arms 70 between first and second positions will be discussed in more detail later.

Cam member 180 also has a second recess 200 in an opposite surface which defines a second camming surface that produces the movement of guide means 26 with respect to frame 16. As shown in FIG. 5, guide arm 136 has a cam follower 202 rotatably supported thereon and received into recess 200 so that rotation of cam member 180 will produce the desired vertical motion of guide means 26 to be described in more detail later. It should be noted at this point that pin 146 is supported on driven shaft 172 so that guide arm 136 is directly adjacent the surface of cam member 180 which has camming surface 200 defined thereon.

Driven shaft 72 also has a second cam member 210 secured thereto by a set screw 212. Second driven cam member 210 has a recess 214 in one surface thereof which defines a camming surface for moving the pusher arms 100 between first and second positions. For this purpose, the outer end of shaft 72, which has pusher arms 100 secured thereto, has a cam arm 216 (FIGS. 6 and 8) with a cam follower 218 rotatably supported on the outer end of cam arm 216 and in engagement with the camming surface defined by recess 214. Thus, rotation of cam member 210 will produce the desired motion between first and second positions for pusher arms 100.

Cam member 210 also has a further camming surface 220 defined on the periphery thereof for producing the desired movement of the movable gripping and pushing fingers. This movement is accomplished by cam means 222 (FIG. 8) which includes first and second cam arms 224 and 226 that extend substantially perpendicular to each other and are secured to a shaft 228 that is pivotally supported on frame 16. Cam means 222 has a cam roller 230 rotatably supported on arm 224 and biased into engagement with camming surface 220 by a spring 232 that has one end connected to arm 224 and the opposite end connected to a pin 234 that is secured to frame 16. Thus, spring 232 at all times maintains cam roller 230 in engagement with camming surface 220.

Arm 226 has first and second camming surfaces 240 and 242 (FIG. 3) defined thereon with camming surface 240 cooperating with upper pusher finger means 107 and camming surface 242 cooperating with upper gripper finger means 76. As shown in FIG. 3, member 120 has a cam arm 244 secured thereto with the outer end of cam arm 244 having a cam roller 246 rotatably supported thereon. Cam roller 246 is continuously biased into engagement with camming surface 240 by biasing means or spring 124 so that fingers 128 are pivoted between positions in response to movement of arm 226 and the particular configuration of camming surface 240. Upper gripper finger means 76 also has a cam arm 250 (FIG. 2) secured thereto with a cam follower 252 on the outer end of arm 250 which is biased into engagement with camming surface 242 by biasing means or spring 98.

Thus, it will be seen that all of the movement for the various elements of the movable guide means, gripper means, and pusher means are all produced by a single driven shaft that has a plurality of camming surfaces defined thereon.

Figure 9:
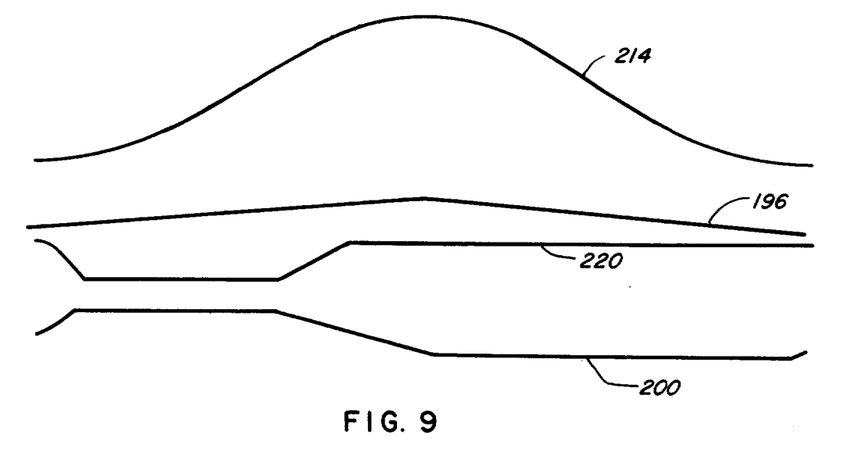
FIG. 9 is a developed view of the cam configurations for the various cams that form part of the apparatus.

FIG. 9 shows developed views for the four camming surfaces and their relation to each other.

Feed Means 22

Before describing the overall operation of the unit, a detailed description of the automatic feeding mechanism 22 for continuously supplying groups of nested cups to a cup receiving path appears to be in order. As indicated above, feed means 22 is designed to automatically supply additional cups to the path (both paths in the illustrated embodiment) whenever a predetermined minimum number of cups are sensed in the path for the cups to the gripping and pushing mechanism.

Figure 7:
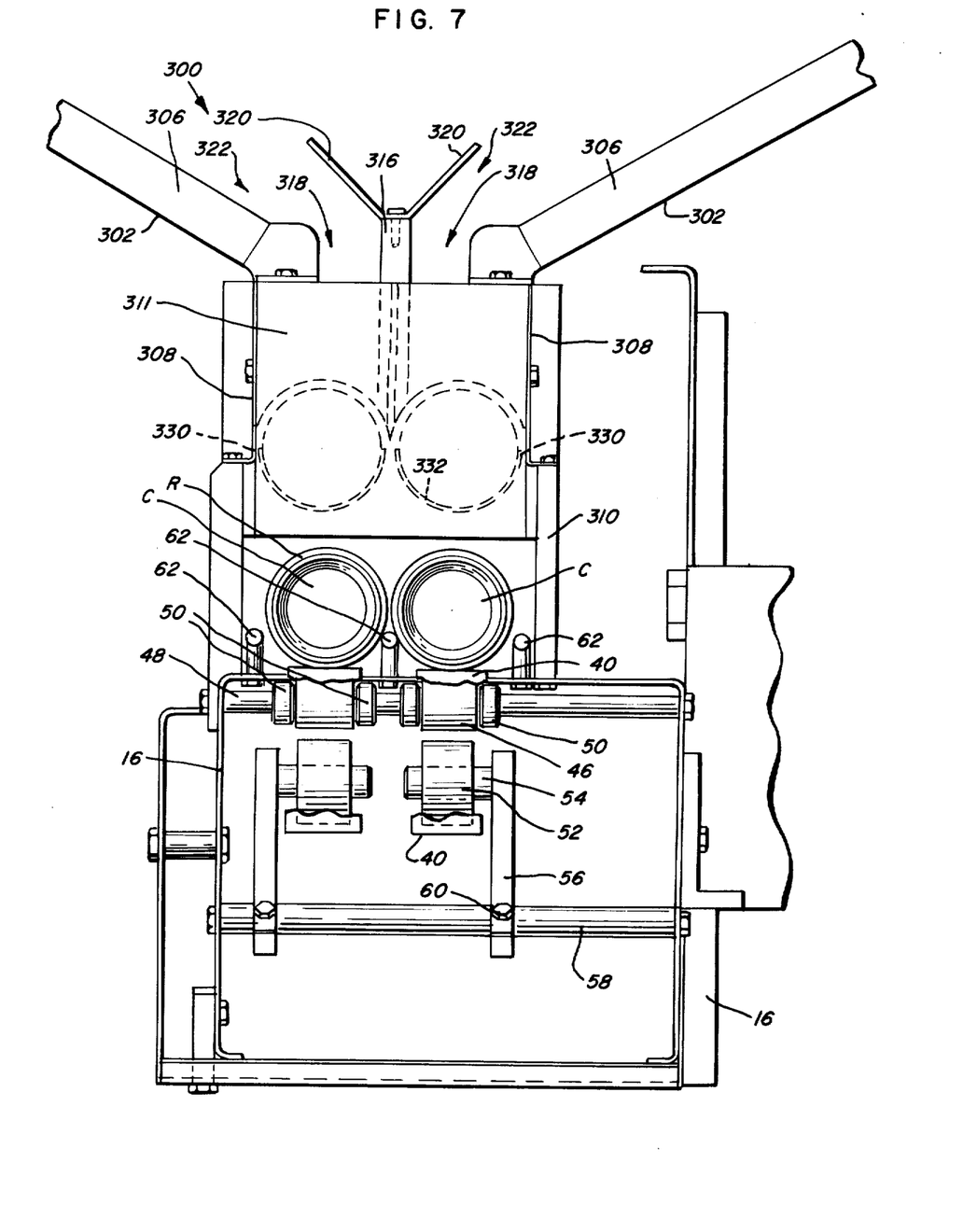
FIG. 7 is an end view of the separating and holding mechanism shown in FIG. 3.
Figure 8:
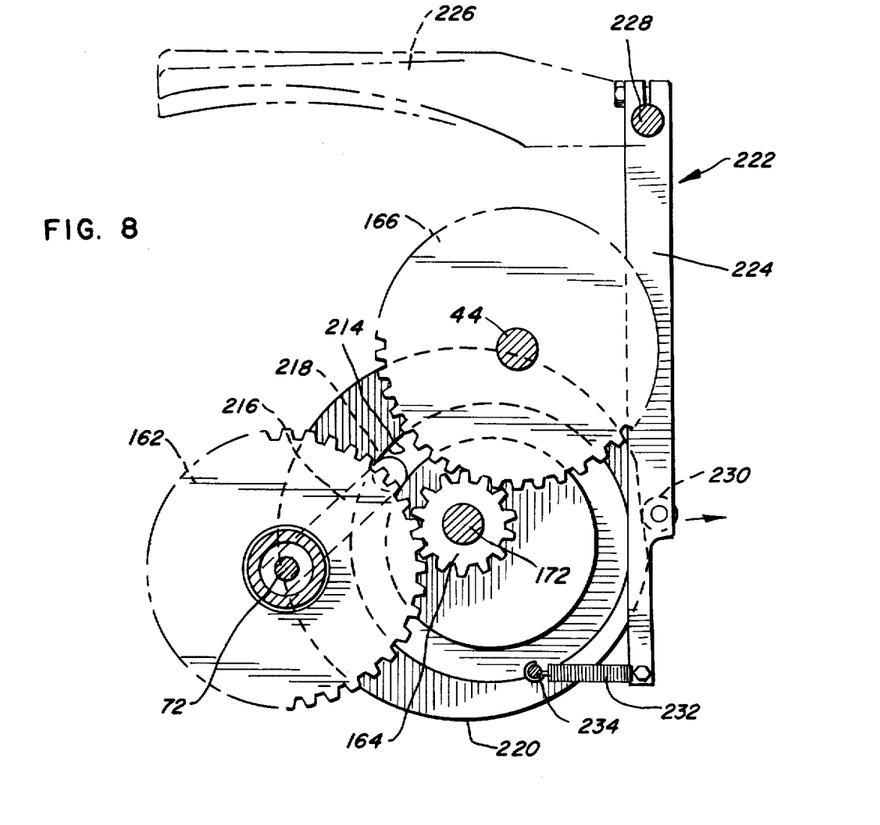
FIG. 8 is a fragmentary vertical section as viewed along line 8—8 of FIG. 4.

Referring to FIGS. 1 and 7, feed means 22 includes a hopper 300 that has upwardly and outwardly inclined first and second walls 302 that are spaced from each other at their inner lower ends. The forward and rear edges of inclined flat walls have vertical wall portions 306 defined thereon (only one being shown for each sidewall). Also, the respective inclined flat walls are connected to the main frame 16 through a pair of vertical plates 308. These vertical plates are spaced from each other and are supported on frame 16 by uprights 310 so that the area between the vertical plates is aligned with the respective paths for the two groups of nested containers C in FIG. 7. The forward and rearward ends of vertical plates have a front wall 311 and a rear wall 312 secured thereto to completely enclose the area between vertical plates 308.

An elongated divider 316 is located centrally between the two vertical plates 308 so as to define first and second elongated openings 318 and the transverse dimension of each of the openings 318 is substantially equal to the diameter of the containers or cups that are being fed by the apparatus. Also, the upper edge of divider 316 has wings 320 extending at an angle therefrom so that a throat 322 is developed between each wing 320 and the associated inclined wall 302. This throat is slightly larger than the diameter of the cups that are being processed and insures that only a single group of nested cups can be received into the openings 318 at any given time.

Figure 4A:
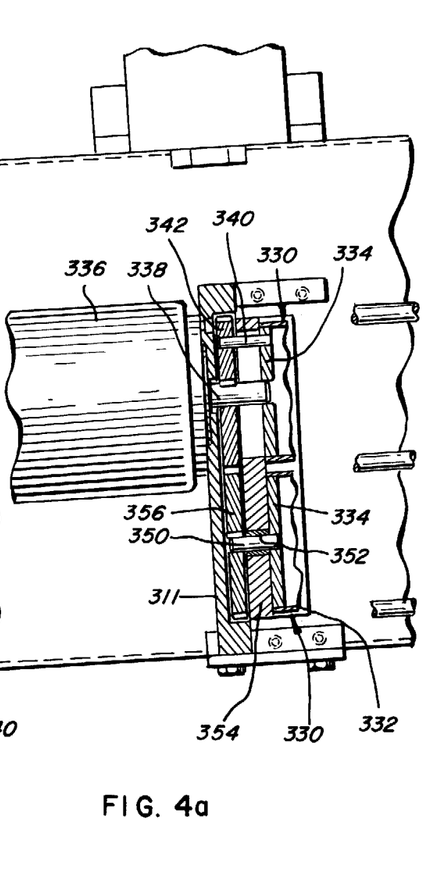
FIG. 4a is a horizontal section viewed generally along line 4a—4a of FIG. 3.

A transfer member 330 (FIGS. 4a and 7) is located adjacent the lower end of each of the openings 318. Transfer member 330 consists of a substantially semicylindrical elongated shell that is normally positioned as illustrated in FIG. 7 so that the shell defines a pocket or open-topped cup-shaped receiving trough which is located within or directly below opening 318 and is vertically aligned with the path defined by conveyor belt 40. The forward and rear ends of the respective semicylindrical shells have discs 334 respectively secured thereto (only the forward ends being shown).

Transfer members 330 are supported for rotation about a fixed axis within elongated openings 318 and are driven by motor means 336. As most clearly shown in FIG. 4a, the forward end of one disc 334 is secured to output shaft 338 of motor means 336 through a pin 340 extending between disc 334 and a gear 342 which is also keyed to output shaft 338. Thus, one transfer member 330 is driven directly by motor means 336 and, since motor means 336 is secured to front wall 311, output shaft 338 defines the fixed axis about which transfer member 330 is rotated. The opposite end of transfer member 330 is supported for rotation on rear wall 312 by a pin (not shown).

The second transfer member 330 is rotated in response to rotation of the first transfer member. For this purpose, the disc 334 of second transfer member 330 has a pin 350 secured thereto and pin 350 extends through an opening in an intermediate wall 354 that is fixed with respect to front wall 311. The opposite end of pin 352 has a second gear 356 secured thereto and in mesh with gear 342. Thus, rotation of output shaft 338 will simultaneously automatically rotate both transfer members the same amount.

Feeding apparatus 22 also has sensing means associated with the path for the nested rimmed containers that senses a minimum number of cups along the path and actuates motor means 336 when a predetermined minimum number of cups is located in the path. The sensing means may be in the form of a photoelectric cell 360 that produces a beam of light which is directed across the path of the moving nested containers adjacent the forward end of hopper 300 (FIG. 3) and this beam of light is normally interrupted by the nested containers. When a predetermined minimum number of containers is located in the path, the last container moves beyond photoelectric cell 360 and the beam is received by a receiver unit (not shown) which actuates motor 336 and rotates both transfer members 330 one revolution or 360°. During this rotational movement, at approximately 180° of rotation, the group of nested containers is free to fall by gravity from transfer means or member 330 onto the path of the containers. At this time, the movement of any additional groups of containers through openings 318 is prevented by semicylindrical shells 332. The two transfer members 330 are then again moved to the position illustrated in FIG. 7 where they receive an additional group of nested containers for subsequent transfer to the respective paths.

Upon the completion of the single revolution of the transfer members 330, motor 336 is shut-off by switch 370 (FIG. 3) that has a switch arm 372 extending therefrom with the outer free end of the switch arm located in the path of pin 340.

The particular feeding mechanism allows an operator to put any number of groups of nested containers into the hopper 300 and these respective groups of nested containers will automatically, individually be fed into the respective openings and be transferred to the cup receiving paths. After receipt onto the cup receiving paths, the moving conveyor belts 40 will move the group of nested containers along the path so that the leading end of this group nests with the last container of the group of containers that are already on the conveyor means.

Operation

The various unique aspects of the method and apparatus of the present invention are believed to be best understood from a description of the overall operation of the machine. Assuming that gripper arms 70, pusher arms 100, guide means 26, gripper finger means 74, 76 and pusher finger means 106, 107 are in the position illustrated in FIG. 3. In this position, lower and upper holding fingers 80 and 96 as well as lower and upper pusher fingers 114 and 129 are all located between the two rims of the leading cup and the next adjacent cup. In addition, the leading cup is gripped between cross brace 108 and fingers 128, while the gripper fingers 80 and 96 are located in the path of movement of the rims of the remaining containers along the path. At this moment, the pusher arms 70 are pivoted about shaft 72 from the first position illustrated in solid-line in FIG. 3 to the second position illustrated in dotted or phantom line in FIG. 3. During this movement, the leading cup or container is positively driven from the remaining containers toward conveyor 133 that forms part of the filling apparatus 12. At the same time, the remaining containers are being positively gripped or held by gripper fingers 80 and 94.

It should be noted at this point that the lower gripper fingers and holding fingers are located in close proximity to each other and the upper gripping fingers 96 are actually located between the transversely spaced pusher fingers 128 so that all of the fingers can be located between an adjacent pair of rims which is a very small dimension for containers of the type under consideration.

As pusher arms 100 are moved between the first and second positions, the remainder of the apparatus is operated so that a subsequent cup can be transferred.

During the forward motion of pusher arms 100, the gripping arms are also moved forwardly a small distance to a second position which distance corresponds approximately to the spacing between adjacent rims of adjacent cups. Also, as the pusher arms are being pivoted between first and second positions, when the arms have traversed about two-thirds the distance between first and second positions, guide means or rails 132 and 134 are moved to the raised position. In this raised position, the rims of the containers are gripped between upper fixed rails 147 and lower rails 130, 132. In order to insure that there is no movement of the cups along the path at this point in time, the enlarged washers 149 on the end of rails 147 are positioned to be in the path of the moving rims R. This raising of the leading end of the stack of nested containers also moves the lower edges of the rims of the containers in the nested condition above the path of movement of fixed fingers 80 and 114 that are moved about a fixed arcuate path around shaft 72. The lower guide means or rails 130 and 132 are maintained in this raised position for a substantial period of time during which the remainder of the actual movement of the various elements occurs.

When the leading container, gripped between opposed pusher finger means including lower cross bar 108 and fingers 114 as well as upper fingers 128 and pusher portions 129, reach the second position illustrated in FIG. 3, cam means 222 including cam surfaces 240 and 242 are pivoted in a generally counterclockwise direction, as viewed in FIG. 3, to pivot gripper finger means 76 and pusher finger means 107 in a clockwise direction. This will release the leading container and allow the leading container to fall by gravity into an opening defined in conveyor 133. It should be noted that the point of release of the leading container is such that the leading container is tilted downwardly and has its lower end already partially received into half of cylindrical opening (not shown) in plate 133a. This insures that the container is properly positioned with respect to conveyor 133.

The gripper finger means and pusher finger means are held in this released position or open position, away from the respective lower fixed fingers, while both sets of arms 70 and 100 are returned to their first positions.

Both the pusher arms and the gripper arms are returned to the first positions where all of the respective fingers are located between the adjacent rims of the leading container or cup and the next adjacent container or cup. When the fingers are all in the first position illustrated in FIG. 3, cam means 222 is pivoted clockwise, while guide means is moved to a lowered position so that the leading cup again is gripped between the opposed pusher finger means while the next adjacent cup is held by the gripper or holding finger means.

The above cycle of operation is repeated and continuously automatically supplies two cups to the respective openings in conveyor 133 so long as there are nested cups along the respective paths. The nested cups for the respective paths are automatically supplied by the feed means 12 including sensor means 360 which senses when there are no cups present below hopper 300. At this time, motor means 336 is actuated and an additional group of cups or containers is delivered to each path by rotation of the respective transfer members 330 and the deposition by gravity of the respective groups of nested containers in the respective transfer members. After the respective groups of nested containers are received onto conveyor belts 40, the belts, which are continuously driven, will move the group of nested containers towards the containers already in the path and will force the leading container into the last container already in the path. Thereafter, the belts continuously urge the group of nested containers along the path to insure that the lead containers are always at the exact location with respect to the pusher and gripper finger means.

SUMMARY

As can be appreciated from the above description, the present method and apparatus combines the container magazine, the container supply and the container dispenser into a single unit that readily can be integrated into a filling machine as a component thereof. The unit is designed so that the unit can be driven by the power source for the filling machine so that the operation can readily by synchronized.

The horizontal positioning of the nested containers has the advantage in that it eliminates the need for the operator to stretch to load the magazine as is required in the vertical magazine feed arrangement. Also, the lower horizontal hopper is placed in a position where the supply of containers is readily visible by the opertor and the hopper may be designed to store a large number of groups of stacks of nested containers which relieves the operator of maintaining a constant watch over the supply of containers that are to be dispensed. Furthermore, the feed mechanism does not require that the groups of nested containers be packaged in a certain manner in the cartons that are normally used for shipping purposes.

The positive transfer of the containers from the stack to the filling machine eliminates uncontrolled movement of the containers that may result in mispositioning for subsequent operations. Also, the positive gripping of the containers facilitates feeding containers with malfunction rims or containers that are wedged with respect to the next adjacent containers.

What is claimed is:

1. Apparatus for continuously feeding individual cups to a station comprising supply means for continuously supplying groups of nested cups having peripheral rims surrounding open ends of said cups, means for moving said nested cups along a generally horizontal path; guide means at one end of said path above said station for guiding said cups from said supply means to said station; pusher means engageable with the rim of the leading cup for driving said leading cup along said guide means, said pusher means having release means for releasing said leading cup at the end of said guide means to allow said leading cup to fall to said station; movable gripper means engageable with the rim of the next cup for holding the remaining cups while said leading cup is being moved along said guide means; and means for moving said guide means between raised and lowered position to hold said nested cups while said gripper means are moved to grip the next succeeding cup.

2. Apparatus as defined in claim 1, in which said gripper means includes an opposed pair of finger means for engaging opposite portions of said rims and in which said opposed finger means are movable towards and away from each other for releasing said leading cup.

3. Apparatus as defined in claim 1, in which said pusher means includes first and second opposed finger means movable relative to each other for engaging said rims.

4. Apparatus for continuously feeding cups to a station comprising conveyor means for moving a group of nested rimmed cups along a generally horizontal path; arcuate guide means defining an arcuate extension of said path toward said station, said guide means being movable between raised and lowered positions with respect to said path; a fixed rail above said movable guide means; a pusher arm pivoted about a fixed axis adjacent said path between first and second positions, said pusher arm having opposed pusher fingers movable towards and away from each other to grip the rim of a leading cup in said group; a gripper member having opposed gripper fingers movable toward and away from each other for engaging the rim of a cup adjacent the leading cup to arrest the movement of the remaining cups; and common drive means for (1) pivoting said pusher arm from said first position to said second position while said pusher fingers grip the rim of a leading cup to move said leading cup along said guide means while said gripper fingers arrest the movement of the remaining cups, (2) raising said arcuate guide means to grip the nested cups between said guide means and said fixed rail, (3) moving said pusher fingers and said gripper fingers away from each other to release said leading cup and said remaining cups, (4) moving said pusher arm to said first position while holding said pusher fingers away from each other, (5) continuously driving said conveyor means, (6) moving said gripper fingers and pusher fingers toward each other when said pusher arm is in the first position and lowering said guide means to grip the rims of the next cups.

5. Apparatus as defined in claim 4, in which a first pusher finger is secured to said pusher arm and a second pusher finger is pivoted on said arm between first and second positions with biasing means normally maintaining said second pusher finger in said first position and in which said drive means includes cam means cooperating with said second pusher finger to move said second pusher finger between said positions.

6. Apparatus as defined in claim 5, in which said gripper member is pivoted about said fixed pivot axis between first and second positions with a first gripper finger secured to said gripper member and a second gripper finger pivoted on said gripper member between first and second positions, biasing means between said gripper member and said second gripper finger normally maintaining said second gripping finger in said first position, and in which said cam means pivots said second gripper finger between positions.

7. Apparatus as defined in claim 6, in which said drive means includes a first driven cam member having first and second camming surfaces, a first cam follower on said gripper member engaging said first camming surface and a second cam follower on said guide member engaging said second camming surface.

8. Apparatus as defined in claim 7, in which said drive means includes a second driven cam member having third and fourth camming surfaces, a third cam follower on said pusher member engaging said third camming surface and a fourth cam follower on said cam means engaging said fourth camming surface.

9. Apparatus as defined in claim 8, in which said cam means includes a cam arm pivoted between first and second positions with said fourth cam follower moving said arm between said positions, said cam arm having fifth and sixth camming surfaces and in which said second pusher finger has a fifth cam follower engaging said fifth camming surface, and said second gripper finger has a sixth follower engaging said sixth camming surface.

10. Apparatus for continuously supplying nested rimmed containers to a station comprising a frame; driven endless conveyor means defining a generally horizontal path receiving nested containers and moving said containers along said path; feed means for feeding containers to said path; arcuate guide means on one end of said conveyor means defining an arcuate extension for said path toward said station; pusher means for gripping the rim of a leading container and moving said container along said guide means for deposit at said station, said pusher means including a pusher arm pivoted between first and second positions about a fixed axis below said path with a fixed pusher finger on said pusher arm adapted to engage a lower edge of the rim of a leading container and a movable pusher finger pivoted on said pusher arm between gripping and released positions; holding means for arresting movement of all but said leading container, said holding means including a holding arm pivoted between first and second positions about a fixed axis below said path with a fixed holding finger on said holding arm adapted to be positioned between the rims of the leading cup and the next adjacent cup, said holding arm having a movable holding finger pivoted between first and second positions and adapted to be positioned between the rims of said leading and adjacent containers; and drive means moving said arms, fingers and guide means in a synchronized manner and drive said conveyor means to grip the rim of a leading container with said gripping fingers and move said leading container along said guide means while holding said remaining containers with said holding fingers, release said leading container to allow said leading container to fall freely to said station; raise said guide means and pivot said holding finger to allow said holding fingers to be moved between a next adjacent pair of rims and pivoting the movable gripping finger to grip the rim of a next leading container.

11. Apparatus as defined in claim 10, in which said drive means includes a driven shaft which defines said fixed axes.

12. Apparatus as defined in claim 10, in which there are a plurality of transversely spaced driven endless conveyor means defining a plurality of generally horizontal paths with said gripping arm having pairs of said gripping fingers equal in number to said paths and said holding arm having an equal number of pairs of holding fingers and in which said guide means defines an arcuate extension for each path so that a plurality of transversely spaced containers are simultaneously delivered to said station.

13. Apparatus as defined in claim 11, in which said feeding means includes a hopper having an elongated opening aligned with and above each path, a transfer member rotatable about a fixed axis in each elongated opening, said transfer member being hollow and substantially semi-cylindrical in cross section and open to receive groups of nested containers from said hopper; intermeshing gear means connected to the respective transfer members; motor means driving said gear means; and sensing means for sensing the presence of a minimum number of containers in each path and intermittently actuating said motor means to rotate each transfer member and deposit a group of nested containers and position said members for receipt of additional containers from said hopper.

14. Feeding apparatus for maintaining a continuous supply of nested cups moving along a path having means for moving said supply of nested cups along said path and means for continuously removing leading cups from said supply of nested cups; comprising: a hopper having an elongated opening at a lower end above said path and adapted to receive a plurality of groups of nested cups; a transfer member located in said elongated opening and supported for rotation about an axis extending generally parallel to said path; said transfer member having a substantially semi-cylindrical pocket normally positioned to receive a group of cups from said hopper; motor means connected to said transfer member; and sensing means for sensing a minimum number of cups along said path and actuating said motor means so that said transfer member is rotated 360° to allow a group of cups to fall by gravity to said path and align said pocket for reception of a next group of cups from said hopper.

15. Feeding apparatus as defined in claim 14, in which said hopper has a second elongated opening extending generally parallel to said first elongated opening and above a second path, a second transfer member rotatably supported about a fixed axis in said second elongated opening and gear means interconnecting said transfer members so that said second transfer member is rotated in response to rotation of said first transfer member with said sensing means sensing the presence of a minimum number of cups in both said paths.

16. Feeding apparatus as defined in claim 15, further including elongated divider means between said openings.

17. Feeding apparatus as defined in claim 16, in which said hopper includes upwardly and outwardly inclined flat walls extending from respective outer edges of said openings.

18. A method for continuously feeding containers to a station comprising (1) providing a continuous supply of nested, rimmed containers (2) continuously urging said nested rimmed containers along a generally horizontal path, (3) interrupting the movement of all but the leading container with gripper means, (4) gripping the leading container adjacent the rim with opposed relatively movable pusher jaws, (5) moving the pusher jaws along an arcuate path toward said station, (6) releasing said leading container so that the container falls by gravity to said station, (7) raising the leading end of the nested cups against a fixed guide to hold said nested cups while the gripper means are moved to the next succeeding cup, (8) returning the gripping jaws to the supply of nested, rimmed containers, and (9) repeating steps 3–8.

19. A method as defined in claim 18, intermittently supplying an additional group of containers to said horizontal path and moving said group toward the remainder of the nested containers so that the leading container of said group is nested into the last container previously along said path.

20. A method as defined in claim 18, in which the interruption of all but the leading container includes interposing relatively movable holding fingers between the rims of the leading container and the next adjacent container.

21. Apparaus for continuously feeding individual cups to a station comprising supply means for continuously supplying groups of nested cups having peripheral rims surrounding open ends of said cups; means for moving said nested cups along a generally horizontal path; guide means at one end of said path above said station for guiding said cups from said supply means to said station; pusher means engageable with the rim of the leading cup for driving said leading cup along said guide means, said pusher means having release means for releasing said leading cup at the end of said guide means to allow said leading cup to fall to said station; and gripper means engageable with the rim of the next cup for holding the remaining cups while said leading cup is being moved along said guide means, said gripper means including an arm pivoted about a fixed axis with respect to said path with a first finger means fixed to said arm and a second finger means movable on said arm towards and away from said first finger means for releasing said leading cup.

22. Apparatus as defined in claim 21, in which said first finger means engages a lower edge of said rims and said second finger engages an upper edge of said rims, further including means for moving said guide means between lowered and raised positions to move said rims above said first finger means.

23. Apparatus as defined in claim 22, in which said second finger means is pivoted on said arm and in which said second finger means is pivoted away from said first finger means when said guide means is moved to a raised position so that said finger means can be moved past a rim of a leading cup.

24. Apparatus for continuously feeding individual cups to a station comprising supply means for continuously supplying groups of nested cups having peripheral rims surrounding open ends of said cups; means for moving said nested cups along a generally horizontal path; guide means at one end of said path above said station for guiding said cups from said supply means to said station; pusher means including a pusher arm pivoted about a fixed axis adjacent said path between first and second positions with first finger means fixed to said arm below said path and second finger means mounted on said arm above said path, said second finger means being movable between first and second positions toward and away from said first finger means to grip and release said cups, said second finger means being in said first position gripping the rim of the leading cup while said pusher arm is pivoted from the first to the second position for driving said leading cup along said guide means, said second finger means being moved to said second position for releasing said leading cup at the end of said guide means to allow said leading cup to fall to said station; and gripper means engageable with the rim of the next cup for holding the remaining cups while said leading cup is being moved along said guide means.

25. Apparatus as defined in claim 24, in which said guide means defines an arcuate extension of said path, and further including means for raising and lowering said guide means, said guide means being in a raised position when said pusher arm is returned to said first position so that said first finger means can be moved past the rim of a leading cup.

26. Apparatus as defined in claim 25, further including fixed rail means above said path and aligned with said guide means so that said nested cups are gripped between said guide means and said rail means when said guide means is in the raised position.

27. Apparatus as defined in claim 26, in which said gripper means includes a gipper arm pivoted about said fixed pivot axis, said gripper arm having a finger fixed thereto below said path and a movable finger on said arm above said path, said movable finger being moved between raised and lowered positions with respect to said rims to release said group of cups.

28. Apparatus as defined in claim 27, in which said guide means and said movable finger are substantially simultaneously moved to the raised position to release said group of cups, further including means for moving said gripper arm between first and second positions while said guide means and movable finger are in a raised position so that said fixed finger and movable finger move past the rim of a leading cup and are positioned to engage the rim of a next cup.

29. Apparatus as defined in claim 28, further including means for continuously supplying cups to said path, said last means including a hopper having a lower open end above and aligned with said path, a cup receiving member rotated about a fixed axis between said lower open end and said path, said member being substantially semi-cylindrical in cross section to define an open cup-shaped receiving trough, motor means for intermittently rotating said member one revolution, and sensing means along said path for sensing the presence of a minimum number of cups in said path and actuating said motor means.

30. A method for continously feeding containers to a station comprising (1) providing a continuous supply of nested, rimmed containers, (2) continuously urging said nested rimmed containers along a generally horizontal path, (3) interposing relatively movable fingers including a first finger below said path and a second finger above said path movable between open and closed positions with respect to said first finger to interrupt the movement of all but the leading container, (4) gripping the leading container adjacent the rim with opposed relatively movable pusher jaws, (5) moving the pusher jaws along an arcuate path toward said station, (6) releasing said leading container so that the container falls by gravity to said station, (7) raising the leading end of the nested containers to grip said containers while the fingers are in an open position and producing relative movement along said path between said fingers and containers to position the fingers between a next adjacent pair of rims, (8) returning the pusher jaws to the supply of nested, rimmed containers, and (9) repeating steps 3–8.

31. A method as defined in claim 30, in which said pusher jaws are returned to said supply of nested, rimmed containers while the leading end of the nested containers is in a raised position.

* * * * *